Oct. 7, 1952 W. VAN LOON 2,613,138
GAS-SOLID CONTACT REACTOR
Filed Feb. 28, 1949
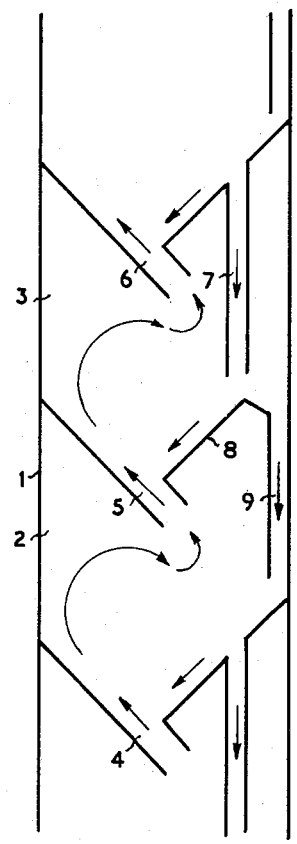
Willem van Loon
INVENTOR
By Cushman, Darby & Cushman
ATTORNEYS Patented Oct. 7, 1952

2,613,138

UNITED STATES PATENT OFFICE 2,613,138

GAS-SOLID CONTACT REACTOR

Willem van Loon, Sittard, Netherlands, assignor to De Directie van de Staatsmijnen in Limburg, handelend voor en namens den Staat der Nederlanden, Heerlen, Netherlands Application February 28, 1949, Serial No. 78,686 In the Netherlands March 8, 1948

2 Claims. (Cl. 23—284)

It is a well-known fact that reactions of gases with fine grained substances can be carried out in which by increasing the concentration of the particles, the solid substance is put into contact with the gas in a fluidised state, so that an intimate contact between the gas and the particles is obtained.

In the French Patent No. 978,287 a method has already been described for increasing the concentration of solid particles in a flowing gaseous medium, in which the gaseous medium together with the solid particles is passed through a column composed of filling bodies. When passing between the filling bodies, the gas current must repeatedly change its direction and it proves that the particles which are carried by the gas current do not follow these changes of the direction resulting in the concentration of the particles to be locally increased.

It has been found that the reactions of gases with fine grained substances can be made to proceed rapidly if the particles are carried by the gas in an upward direction through a vertical column, consisting of a number of reaction spaces superimposed upon each other in such a manner that the gas current, carrying the particles, enters each of these reaction spaces in a direction which forms an angle with the vertical, while the particles which do not follow the changes of the direction of the gas and move downwards under the influence of the force of gravity are conducted in such a manner that the stream of particles thus formed meets again with the gas current entering the reaction space.

In the process according to the invention changes of the direction of the gas current occur in each of the superimposed reaction spaces as a result of the fact that the gas current enters the reaction space at an angle with the vertical and after having collided against the wall and the top of the space streams into the passage towards the superimposed reaction space. It has proved that only part of the particles follow these changes in the direction of the gas current, whereas those particles which do not follow the changes of the direction of the gas current and move downwards under the influence of the force of gravity are concentrated into a stream of particles which meets again with the gas current entering the reaction space. The contact between the gas and the particles is promoted by the whirls formed inside the reaction space.

The gas current may be introduced into the reaction spaces at any angle with the vertical, while the stream of particles may be guided in such a manner that its direction, when meeting with the gas current, is perpendicular to the direction of the gas current so that the cross flow principle is applied, or in an other direction which forms an acute or obtuse angle with the direction of the gas current.

The contact between the particles and the gas may be further promoted by withdrawing a portion of the stream of particles mentioned and guiding it through one or more connecting tubes into the underlying reaction space where it is put again into contact with the gas.

By means of these connecting tubes, the process according to the invention may also be carried out in such a manner that the particles or a portion thereof, are first passed downwards through the reaction column or part of it, before being mixed with the gas current.

Now it is possible at the same time to apply the counterflow principle by introducing the particles into the top of the reaction column and discharging them through the bottom, notwithstanding the fact that the particles ascend through the reaction column in uniflow with the gas. Moreover it is possible to introduce part of the particles in uniflow with the gas while simultaneously the other part is supplied in counter flow in the way mentioned before. If the uniflow principle is applied the solid substance may be supplied separately, but if desired the gas may also be charged with the particles being introduced into the reaction column. The gas as well as the particles may be supplied to a definite reaction space, but it is also possible to introduce the gas and/or the particles into more than one reaction space, either simultaneously or alternatively.

The residence time of the particles in the reaction column depends upon the angle at which the gas current is introduced into the reaction spaces and may moreover be varied by changing the velocity of the gas current.

In order to separate the particles the gas leaving the reaction column may be passed through a dust extractor, e. g. a cyclone, while the separated particles may be returned to the reaction column.

The process according to the invention may be applied to all kinds of reactions between gases and fine grained substances such as for instance: reactions, in which the gas reacts with the solid substance and gaseous products are formed, such as the gasification of fine grained fuels; if this gasification is carried out for instance in accordance with the process described in the Dutch Patent No. 68,486, the process according to the invention may be applied to the big reactor mentioned in the above application, reactions, in which the solid substance removes certain components of the gas as in the purification of gases, reactions, in which the solid substance acts as a catalyst as e. g. in the catalyst reactions in the gas phase.

A schematical outline as to how the process according to the invention may be carried out is shown in the annexed figure. In the reaction column 1, consisting of a number of reaction spaces superimposed upon each other, the spaces 2 and 3 of which are represented in the drawing, a gas stream is introduced into the reaction space 2 through the passage 4 under an angle of 45°, in which space the direction of the gas stream is changed a few times, subsequently passing through the passage 5 into the reaction space 3 also under an angle of 45° in which space the same phenomena occurs as in space 2, after which the gas stream is guided into the superimposed space through the passage 6. When the counterflow principle is applied, the particles of the solid substance are supplied to the top of the column and pass through the tube 7 into the reaction space 3 where they travel along the inclined bottom 8 towards the passage 5 in a direction perpendicular to the direction of the gas stream. Instead of the inclined bottom 8 also another inclined plane may be applied in the reaction space, while it is moreover possible to allow the particles to accumulate, so that the particles, afterwards entering through the connecting tube, may slide down along the accumulated particles towards the gas stream, the accumulated particles may then at intervals be conducted into the underlying reaction space.

The majority of the particles is entrained by the gas stream in the whirls arising in the reaction space but part of these particles separate from the gas stream before the latter streams into the passage 6, and move downwards under the influence of the force of gravity, so that a flow of particles is formed, moving along the inclined bottom 8. A portion of the particles passes towards the space 2 through the connecting tube 9. By constructing a number of 5 to 10 reaction spaces above each other a closer contact between the particles and the gas is obtained.

The downward transfer of the particles through the connecting tubes may be controlled automatically by constructing the connecting tubes in the manner schematically outlined in the drawing for the tube 9, the debouchment of which lies a short distance above the inclined plane in space 2. In this case, the particles will flow through tube 9 until the debouchment of the tube is closed by the accumulation of particles on the inclined plane. This closing of the tube 9 causes it to fill with particles descending from above and, subsequently, an accumulation of particles is formed in the superimposed reaction space 3. Because of the fact that the stream of particles returns freely towards the gas current along the inclined plane below tube 9, the downward flow of particles is only held up until enough particles have moved towards the gas current as to again open the debouchment of the tube 9 and the downward transfer of particles through this tube commences again. This automatic control may be influenced by regulating the discharge of the particles from the reaction column, such as by restricting the flow of particles from the vertical tube descending from zone 2, causing an accumulation of particles in zone 2, as mentioned above. If the counterflow principle is applied, i. e., by feeding the particles in the top of the column, the outlined control of the transfer of particles may be combined with the supply of the particles, so that during the interruption of the transfer of the particles, the supply of particles is cut off by closing of the supply tube through accumulation of particles, as discussed above.

I claim:

1. Apparatus for creating intimate contact between finely divided solid substances and gases in carrying out chemical reactions which comprises a series of vertically superimposed enclosed chambers, each chamber having a bottom at least a portion of which constitutes a plane inclined at an angle to the vertical, tubes fixed into the bottoms of each of said chambers at the bases of said inclined planes with the longitudinal axes of the tubes at an angle to the vertical and at an angle to said inclined planes, said tubes constituting communicating passages between adjacent chambers, and at least one of said chambers having a vertical tube descending from the bottom thereof at a point appreciably distant from the point of entrance of the inclined tube into said chamber, said vertical tube having its debouchment above the inclined plane portion of the underlying chamber.

2. Apparatus as claimed in claim 1, wherein the bottom of said underlying chamber at the point vertically below the debouchment of said vertical tube is a peak formed by two inclined plane portions which are inclined at an angle to one another.

WILLEM VAN LOON.

REFERENCES CITED

The following references are of record in the file of this patent:

UNITED STATES PATENTS

| Number | Name | Date |
|---|---|---|
| 1,384,689 | Davis | July 12, 1921 |
| 1,799,478 | Peebles | Apr. 7, 1931 |
| 2,296,522 | Hartley | Sept. 22, 1942 |
| 2,371,619 | Hartley | Mar. 20, 1945 |
| 2,381,119 | Dill | Aug. 7, 1945 |